United States Patent
Hauptmann et al.

(10) Patent No.: US 7,023,985 B1
(45) Date of Patent: Apr. 4, 2006

(54) CIRCUIT FOR ELECTRONICALLY GENERATING A CALL IMPEDANCE

(75) Inventors: Jörg Hauptmann, Wernberg (AT); Alexander Kahl, Villach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/806,479

(22) PCT Filed: Oct. 21, 1999

(86) PCT No.: PCT/DE99/03385

§ 371 (c)(1),
(2), (4) Date: Jul. 13, 2001

(87) PCT Pub. No.: WO00/24181

PCT Pub. Date: Apr. 27, 2000

(30) Foreign Application Priority Data

Oct. 21, 1998 (DE) ............................... 198 48 606
Dec. 18, 1998 (DE) ............................... 198 58 761

(51) Int. Cl.
*H04M 1/76* (2006.01)
(52) U.S. Cl. .................. 379/394; 379/398; 379/373.01
(58) Field of Classification Search ................ 379/394, 379/398
See application file for complete search history.

(56) References Cited

U.S. PATENT DOCUMENTS 5,271,059 A    12/1993   Dielacher et al.
5,485,516 A     1/1996   Hauptmann
5,796,815 A     8/1998   Guercio et al.
6,091,806 A *   7/2000   Rasmus et al. .......... 379/93.05
6,275,581 B1*   8/2001   Fischer et al. .............. 379/398

FOREIGN PATENT DOCUMENTS

JP          9-46273          2/1997

OTHER PUBLICATIONS

Noll, A. M., Introduction to Telecommunication Electronics, Second Edition, Artech House 1995, pp. 316-317.*
Dittmer, G., Linear Technology Magazine, Feb. 1995, p. 3.*
BAPT 223 ZV5, issued Feb. 5, 1994, p. 12, chapter 2.6.1.
English Language Abstract of JP-9-46273.

* cited by examiner

*Primary Examiner*—Daniel Swerdlow
(74) *Attorney, Agent, or Firm*—Greenblum & Bernstein, P.L.C.

(57) ABSTRACT

The present invention relates to a circuit for electronically generating a call impedance in telephone terminals, comprising a call alternating voltage that may be tapped between a first and a second input terminal. The inventive circuit has a regulating device with a programmable digital filter for regulating impedance, wherein the transmission function of the regulating device can be adjusted by programming the filter coefficients of the digital filter. The inventive regulating device makes it possible to adapt the call impedance to different country-specific requirements. To this end, the regulating device has a programmable digital filter that may be embodied as a digital signal processor. In an especially preferred embodiment, the digital filter is implemented in the form of a program in the digital signal processor.

9 Claims, 4 Drawing Sheets

CIRCUIT FOR ELECTRONICALLY GENERATING A CALL IMPEDANCE

The present invention relates to a circuit arrangement as claimed in the preamble of patent claim 1, as is known from U.S. Pat. No. 5,485,516.

In analog telecommunications systems, in order to notify a subscriber of an incoming call, a ringing signal is transmitted to the terminal of the subscriber. This ringing signal takes the form of a sinusoidal alternating voltage, the so-called ringing voltage or ringing alternating voltage. The called subscriber terminal has to detect the ringing signal and when necessary react to the ringing signal (for example by notifying the called subscriber by means of a ringing tone or by connecting to the line). In order to adapt to the telephone line, subscriber terminals form ringing impedances which have to satisfy different requirements owing to the differing design of the telephone networks in different countries. In Germany, the ringing impedance requirements can be obtained from the requirement catalog of the Bundespost [German Federal postal service] BAPT 223 ZV5, issue 5.2.1994, page 12, chapter 2.6.1 Ringing Impedance.

In telephone terminals, ringing impedances are usually formed from a resistor and a capacitor, the resistor forming the resistive part, and the capacitor the capacitive part, of a ringing impedance. The values of the resistor and capacitor must be adapted here to the requirements for a particular country, which requirements prescribe specific values for the ringing impedance. Owing to these requirements, a telephone terminal must have a specific design for a particular country. The disadvantage here is country. The disadvantage here is the increased expenditure on the production of subscriber terminals because a separate subscriber terminal variant which fulfils the ringing impedance requirements has to be manufactured for each country.

From U.S. Pat. No. 5,485,516 it is known to make the line impedance of a telephone line adaptable to the line conditions, for example the transmission characteristics, by means of a transistor and a controller which controls this transistor. However, the ringing impedance is implemented here with a capacitor and a resistor, and both have to be adapted in a specific way for a particular country.

The invention is therefore based on the technical object of making available a circuit arrangement of the type mentioned at the beginning in which the ringing impedance can be adapted easily, and yet as flexibly as possible, to the given conditions by circuit means.

This objective is achieved according to the invention by means of a circuit arrangement having the features of patent claim 1.

Accordingly, a circuit arrangement of the type mentioned at the beginning is made available in which a controller is provided for setting the impedance, said controller adapting the ringing impedance to the given conditions and having a programmable digital filter, and it being possible to set the transmission function of the controller by programming the filter coefficients of the digital filter.

Advantageous refinements of the circuit arrangement emerge from the respective subclaims.

The controller according to the invention can be used to program the ringing impedance and thus adapt it to the respectively desired conditions, for example to a very wide range of different specific requirements for particular countries. For this purpose, the controller has a digital filter which can be programmed, for example, by means of a program-controlled unit. The transmission function of the controller, and thus the ringing impedance, can be set by programming the filter coefficients of the digital filter. In one advantageous embodiment, the program-controlled unit is embodied as a known microprocessor, for example a digital signal processor (DSP). In a particularly preferred embodiment, the digital filter is implemented in the form of a program in the digital signal processor.

This provides advantages in particular when producing subscriber terminals, because the design of a subscriber terminal is uniform and the country in which the subscriber terminal can be used is determined only by setting the transmission function of the controller.

In one preferred embodiment, the circuit arrangement forms the ringing impedance by means of a capacitor, which is connected between a first terminal for a two-wire line and a rectifier, and a transistor whose load path is connected between a first output of the rectifier and a reference potential. The transistor is controlled by a controller, the transmission function of the controller being adjustable in order to adapt the ringing impedance to specific requirements for particular countries. In particular, advantages are obtained when producing subscriber terminals because the design of a subscriber terminal is uniform and the country in which the subscriber terminal can be used is determined only by setting the transmission function of the controller.

In one preferred embodiment, a digital power inverter circuit is connected upstream of the digital filter. In a further preferred embodiment, a digital rectifier circuit is connected downstream of the digital filter.

In one preferred embodiment, the controller has an analog integrator circuit which is connected upstream of the transistor and which integrates the difference between a first input voltage and a second input voltage and whose output signal controls the transistor.

In a further preferred embodiment, a voltage divider divides the voltage present at the first output of the rectifier into a smaller voltage.

In a particularly preferred embodiment, the digital power inverter circuit, the digital filter and the digital rectifier circuit are integrated on one digital module.

In a preferred embodiment, the analog/digital converter, the digital/analog converter and the analog integrator circuit are integrated on one analog module.

In a further preferred embodiment, the controller has a first analog integrator circuit which is connected upstream of the control terminal of the first transistor and which integrates the difference between a first input voltage and a second input voltage and whose output signal controls the first transistor, and a second analog integrator circuit which is connected upstream of the control terminal of the second transistor and which integrates the difference between a third input voltage and a fourth input voltage and whose output signal controls the second transistor. This circuit arrangement advantageously has no need of a rectifier circuit for rectifying the ringing alternating voltage.

A first voltage divider preferably divides the first potential of the ringing alternating voltage, and a second voltage divider preferably divides the second potential of the ringing alternating voltage.

In one preferred embodiment, a first and a second analog/digital converter, a first and a second digital/analog converter and the first and second analog integrator circuits are integrated on one analog module.

In a preferred embodiment, the transistors are embodied as n-channel MOSFETs.

Further advantageous embodiments and developments of the invention can be found in the subclaims, the following description and the figures.

The invention is explained in more detail below by means of an advantageous exemplary embodiment which is given in the figures of the drawing, in which.

In all the figures of the drawing, identical or functionally identical elements and signals are provided with identical reference symbols.

Figure 1:
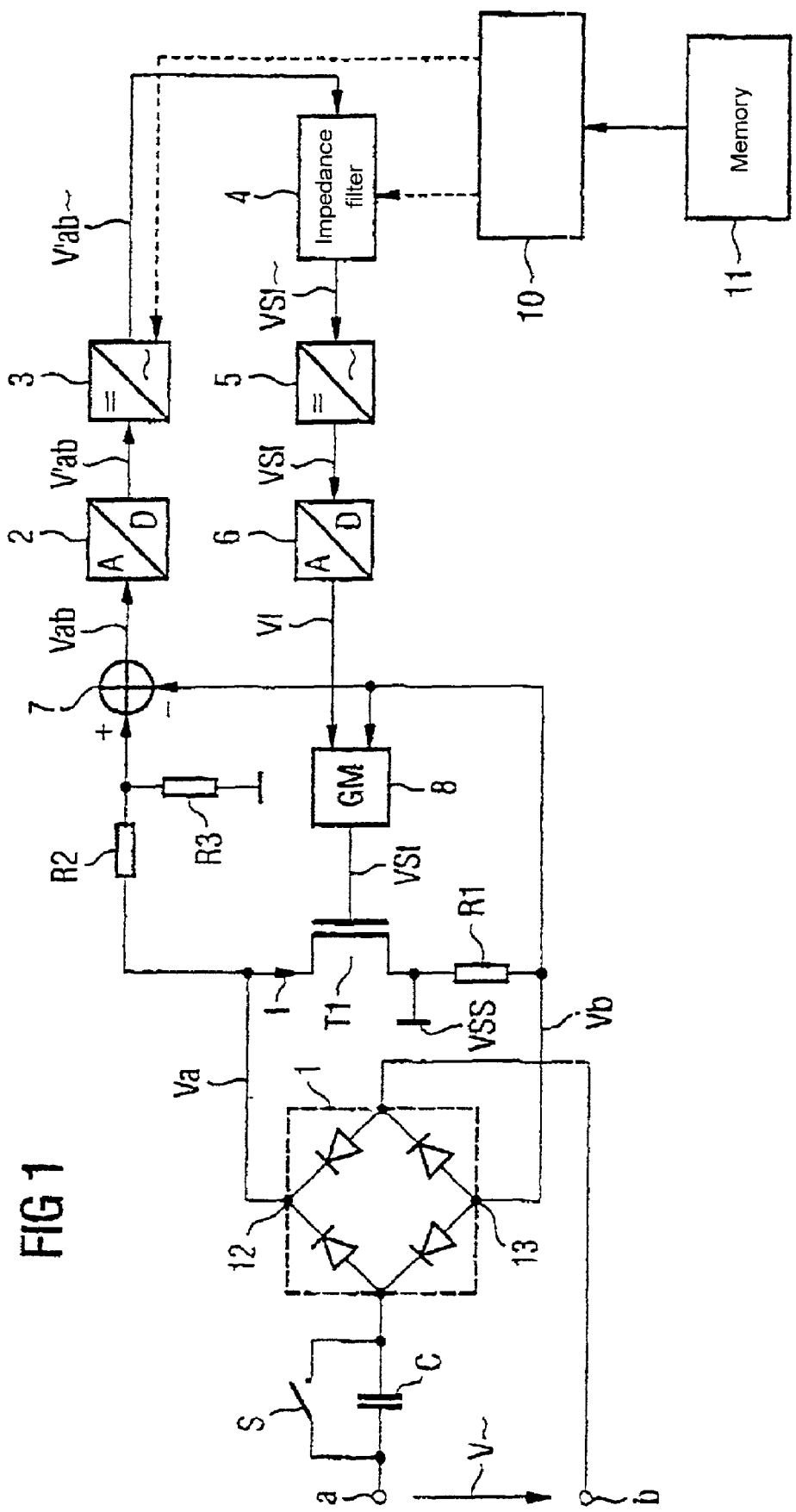
FIG. 1 shows a first exemplary embodiment of a circuit arrangement for electronically generating a ringing impedance.

The circuit arrangement illustrated in FIG. 1 for electronically generating a ringing impedance has two terminals a and b which can be connected to a two-wire line of a telephone network. Ringing signals can be received from another subscriber via the two-wire line, the ringing signals being generated by means of a sinusoidal alternating voltage V~ with the frequency fR. This alternating voltage becomes the ringing alternating voltage below. The switch S, which corresponds to the hook switch, is open with the result that direct signal elements in the ringing signal are blocked by means of a capacitor C.

The capacitor C simultaneously forms a capacitive part of the ringing impedance. Connected downstream of the capacitor C is a bridge rectifier 1 which rectifies the ringing alternating voltage. The following circuits are provided with voltage from the rectified ringing alternating voltage. Furthermore, the rectified ringing alternating voltage ensures the setting of the conduction current I which is used to set the ringing impedance. A rectified positive ringing alternating voltage Va or negative ringing alternating voltage Vb is applied to a first output 12 and a second output 13 of the bridge rectifier 1, respectively. The rectified positive ringing alternating voltage Va and negative ringing alternating voltage Vb are referred to a reference potential VSS, the amplitude of the rectified positive ringing alternating voltage Va being much greater than the amplitude of the rectified negative ringing alternating voltage Vb.

The first output 12 and second output 13 of the bridge rectifier 1 are connected to the reference potential VSS via a transistor T1 and a resistor R1, respectively. The transistor T1 forms, in combination with the capacitor C, the ringing impedance. The ringing impedance can be adapted to the various requirements which are specific to particular countries by controlling the resistance of the transistor T1. For this purpose, a control voltage VSt for the transistor T1 is derived from the rectified positive ringing alternating voltage Va and negative ringing alternating voltage Vb using a digital controller.

The rectified positive ringing alternating voltage Va, which has high voltage values, is divided into a smaller voltage by means of a voltage divider R2 and R3, in order to be processed by the following circuits in which signals have only low voltage levels in comparison with the rectified positive ringing alternating voltage.

The voltage-divided positive ringing alternating voltage Va and the negative ringing alternating voltage Vb are fed to a subtractor circuit 7 at whose output a difference voltage Vab is present.

The difference voltage Vab is subsequently sampled by a first analog/digital converter 2 with a sampling rate fs and converted into a digital signal V'ab.

Figure 2:
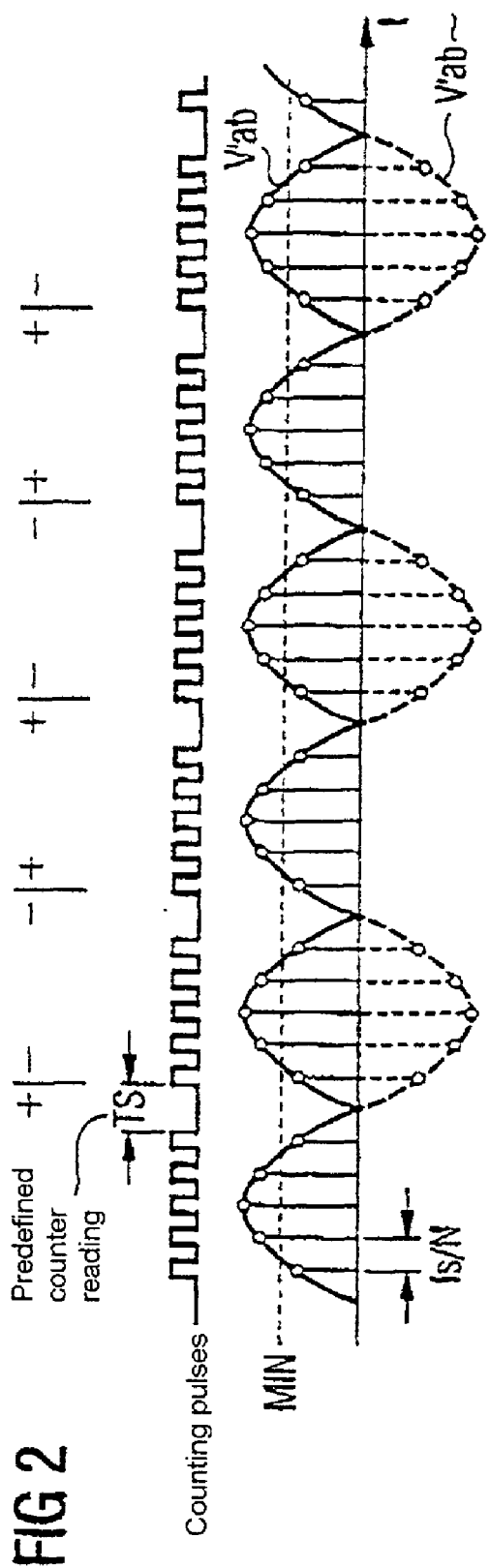
FIG. 2 shows a timing diagram with a digital input signal and the digital output signal, calculated therefrom, of a digital power inverter circuit.

The digital signal V'ab is fed to a first digital power inverter circuit 3. FIG. 2 illustrates a timing diagram with the digital input and output signals of the digital power inverter circuit. If the digital values V'ab drop below a lower predefinable threshold value MIN at the input of the first digital power inverter circuit 3, a counter begins to count with the sampling rate fs/N of the digital signal. If the counter reading exceeds a predefinable value which can be set by a digital control device 10 in accordance with the frequency of the ringing alternating voltage, the digital values at the output V'ab~ of the first digital power inverter circuit 3 are inverted by reversing their sign after a waiting time TS expires. During the waiting time TS, the counter remains reset and does not begin to count again until the digital values V'ab drop below the threshold value MIN at the input. A digital output signal, which constitutes a first ringing alternating voltage referred to the reference potential VSS, is thus generated from the digital input signal which constitutes a rectified sinusoidal oscillation—the ringing alternating voltage referred to the reference potential VSS.

The digital output signal of the digital power inverter circuit 3 is fed to a digital filter 4. For adaptation to specific requirements for particular countries, the digital filter 4 can be programmed by means of a digital control device 10 in order to be able to adapt the ringing impedance, and for this purpose it has a programmable transmission function k. For this purpose, the phase shift and amplification which are necessary for the ringing impedance are calculated from the input signal V'ab~ by means of the digital filter 4. The digital filter 4 can be embodied here as a digital hardware filter in which the coefficients are programmable. The digital filter can likewise be embodied as a signal processing algorithm on a digital signal processor, the filter function being adjustable for various ringing impedances by means of variables.

A digital rectifier circuit 5 rectifies the digital output signal of the digital filter 4 VSI~ by forming absolute values.

The output signal VSI of the digital rectifier circuit 5 is converted into an analog signal VI by a digital/analog converter 6.

The analog signal VI is fed to a first input of an analog integrator circuit 8. The negative ringing alternating voltage Vb, which is proportional to the conduction current, is fed to the analog integrator circuit 8 via a second input. A difference, which is subsequently integrated, is formed in the analog integrator circuit 8 from the two input signals. The output signal VSt of the analog integrator circuit 8 is fed to the control terminal of the transistor T1. The transistor T1 is set by means of the supplied voltage VSt.

Figure 3:
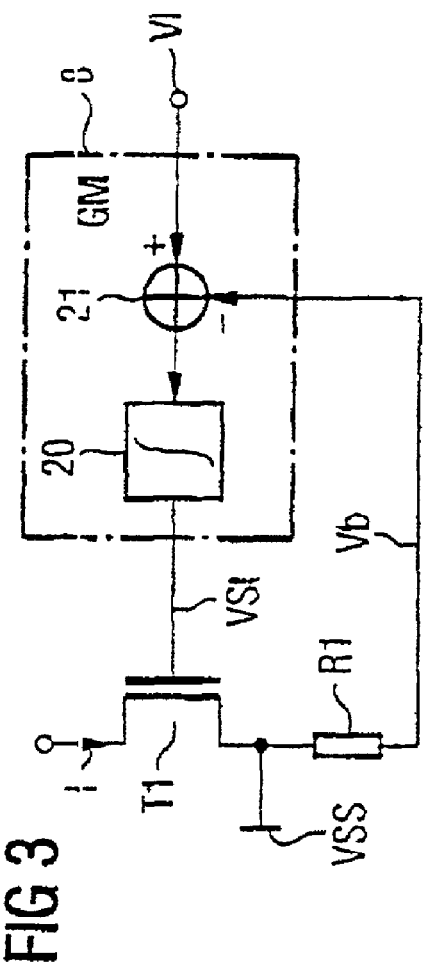
FIG. 3 shows a voltage-controlled power source for setting the conduction current according to FIG. 1.

FIG. 3 illustrates the adjustability of the conduction current I by means of the transistor T1. The analog signal VI of the digital controller and the negative ringing alternating voltage Vb, which is proportional to the conduction current, are fed to a subtractor circuit 21 at whose output the difference voltage VI–Vb is present. The difference voltage VI–Vb is integrated by an integrator circuit. The voltage VSt which is fed to the control terminal of the transistor T1 is present at the output of the integrator circuit 20. The conduction current I is set by means of the transistor T1. The integrator circuit 20 integrates the difference voltage VI–Vb until the difference voltage VI−Vb=0. A conductance value GM=I/VI=1/R1 can be derived from this using Vb=R1*I=VI.

The conduction current I is thus controlled by means of the analog signal VI of the digital controller in such a way that the necessary ringing impedance Z is calculated for a difference voltage Vab from the amplification factor ksense of the voltage divider R2 and R3, the transmission function k of the digital filter 4 and the conductance value GM of the analog integrator circuit:

$$Z = \frac{Vab}{I} = \frac{1}{ksense \cdot k \cdot GM} = \frac{R1}{ksense} = f(k)$$

The conduction current I can thus be set by means of the transistor T1. The transistor T1 can in turn be set by means of the programmable transmission function k of the digital filter 4. The ringing impedance thus depends on the programmable transmission function k of the digital filter 4 and can be adapted to various specific requirements for particular countries by simply reprogramming the transmission function k of the digital filter 4. To do this, specific values for a particular country can be stored for the ringing impedance in a memory 11, for example. The digital control device 10 reads out of the memory 11 the values from the memory 11 which are necessary for programming a specific ringing impedance for a particular country, programs the digital filter 4 accordingly and sets the digital power inverter 3 to the frequency fR of the ringing alternating voltage.

Figure 4:
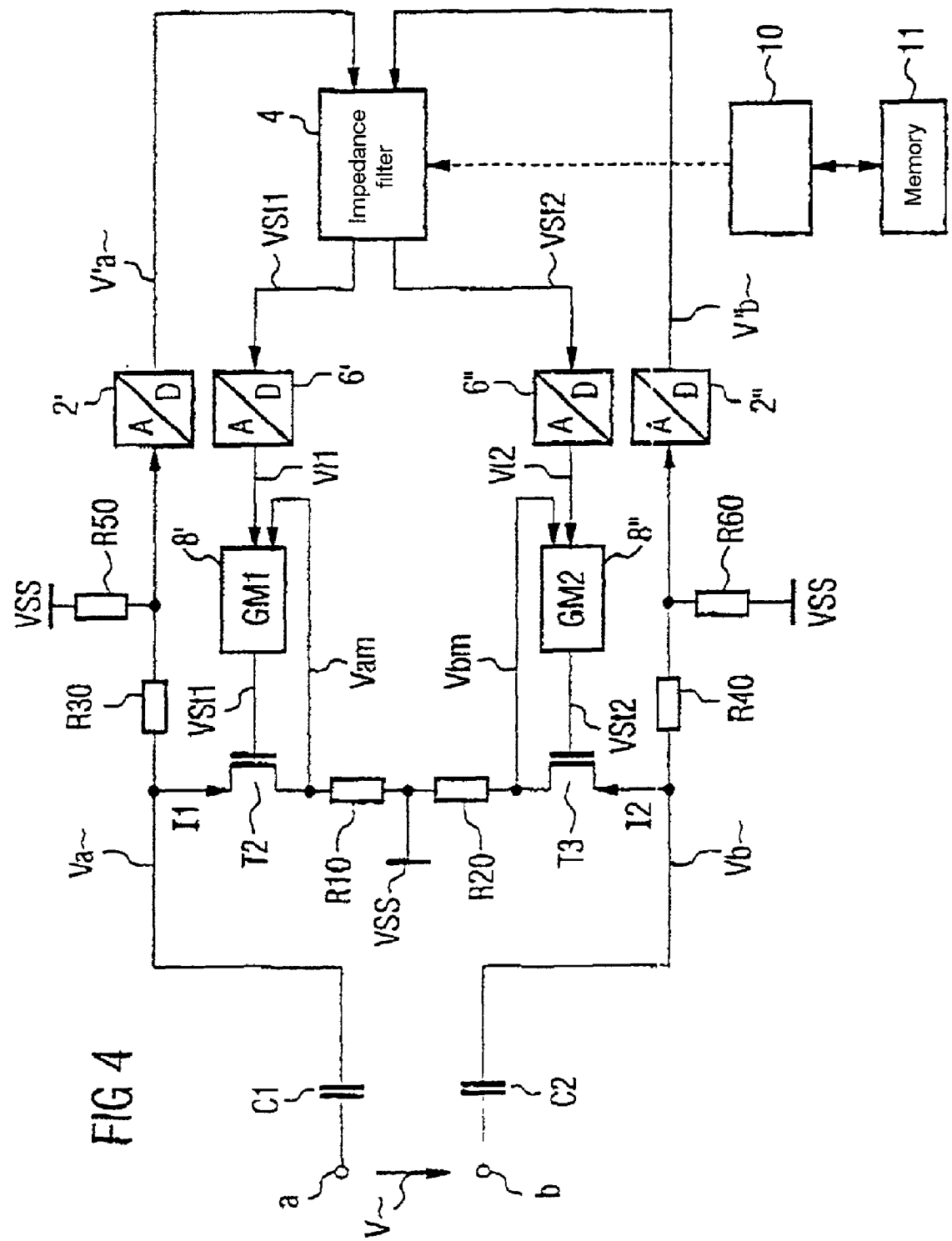
FIG. 4 shows a second exemplary embodiment of a circuit arrangement for electronically generating a ringing impedance.

The circuit arrangement illustrated in FIG. 4 for electronically generating a ringing impedance has a first terminal a and a second terminal b which can be connected to a two-conductor subscriber line. Ringing signals can be received via the two-wire line, the ringing signals being generated by a sinusoidal alternating voltage V~ with a frequency fR. Direct signal elements in the ringing signal are blocked by means of a first capacitor C1 and a second capacitor C2.

The first capacitor C1 and the second capacitor C2 also form a capacitive part of a ringing impedance.

A first series circuit composed of the first capacitor C1, the load path of a first transistor T2 and a first resistor R10 is provided for the positive half-wave of the ringing alternating voltage V~. The series circuit connects the first terminal a to a reference potential VSS. A first potential Va~ of the ringing alternating voltage V~ can be tapped at the connecting point of the first capacitor C1 and of the first transistor T2.

A second series circuit composed of the second capacitor C2, the load path of a second transistor T3 and a second resistor R20 is provided for the negative half-wave of the ringing alternating voltage V~. The series circuit connects the second terminal b to the reference potential VSS. A second potential Vb~ of the ringing alternating voltage Vb~ can be tapped at the connecting point of the second capacitor C2 and of the second transistor T3.

The ringing impedance is formed in each case for the positive or negative half-wave of the ringing alternating voltage V~ by the first capacitor C1 and the first transistor T2 or the second capacitor C2 and the second transistor T3. To do this, a first conduction current I1 and a second conduction current I2 are respectively set in the first and second series circuits respectively.

For the positive half-wave, the second transistor T3 is connected with low impedance so that the second series circuit between the second terminal b and the reference potential VSS has low impedance. For the negative half-wave, the first transistor T2 is connected with low impedance, so that the first series circuit between the first terminal a and the reference potential VSS has low impedance.

The first potential Va~ (positive half-wave) is divided by a first voltage divider R30 and R50 into a smaller voltage which is converted into a first digital signal V'a~ by a first analog/digital converter 2'.

The second potential Vb~ (negative half-wave) is divided by a second voltage divider R40 and R60 into a smaller voltage which is converted into a second digital signal V'b~ by a second analog/digital converter 2'.

The first digital signal V'a~ and the second digital signal V'b~ are fed to a digital filter 4 (impedance filter).

The digital filter 4 is programmed by a control unit 10—for example a microprocessor—which is connected to a memory 11. The programming of the digital filter 4 serves here to set specific parameters of the ringing impedance for particular countries. To do this, different specific data for particular countries can be stored in the memory 11. Depending on the area of application of the circuit arrangement, the control unit 10 reads the specific data for a particular country out of the memory 11 and correspondingly programs the digital filter 4.

The digital filter 4 generates a first digital output signal VSI1 and a second digital output signal VSI2.

The first digital output signal VSI1 is converted by a first digital/analog converter 6' into a first input signal VI1 for a first analog integrator circuit 8'.

In parallel, the second digital output signal VSI2 is converted by a second digital/analog converter 6" into a second input signal VI2 for a second analog integrator circuit 8".

The first analog integrator circuit 8' integrates the difference between the first input signal VI1 and a second input signal Vam which is tapped at the connecting point of the load path of the first transistor T2 and of the first resistor R10. The second input signal Vam=R10*I1 depends here on the first conduction current I1.

In parallel, the second analog integrator circuit 8" integrates the difference between the first input signal VI2 and a second input signal Vbm which is tapped at the connecting point of the load path of the second transistor T3 and of the second resistor R20. The second input signal Vbm=R20*I2 depends here on the second conduction current I2.

Figure 5:
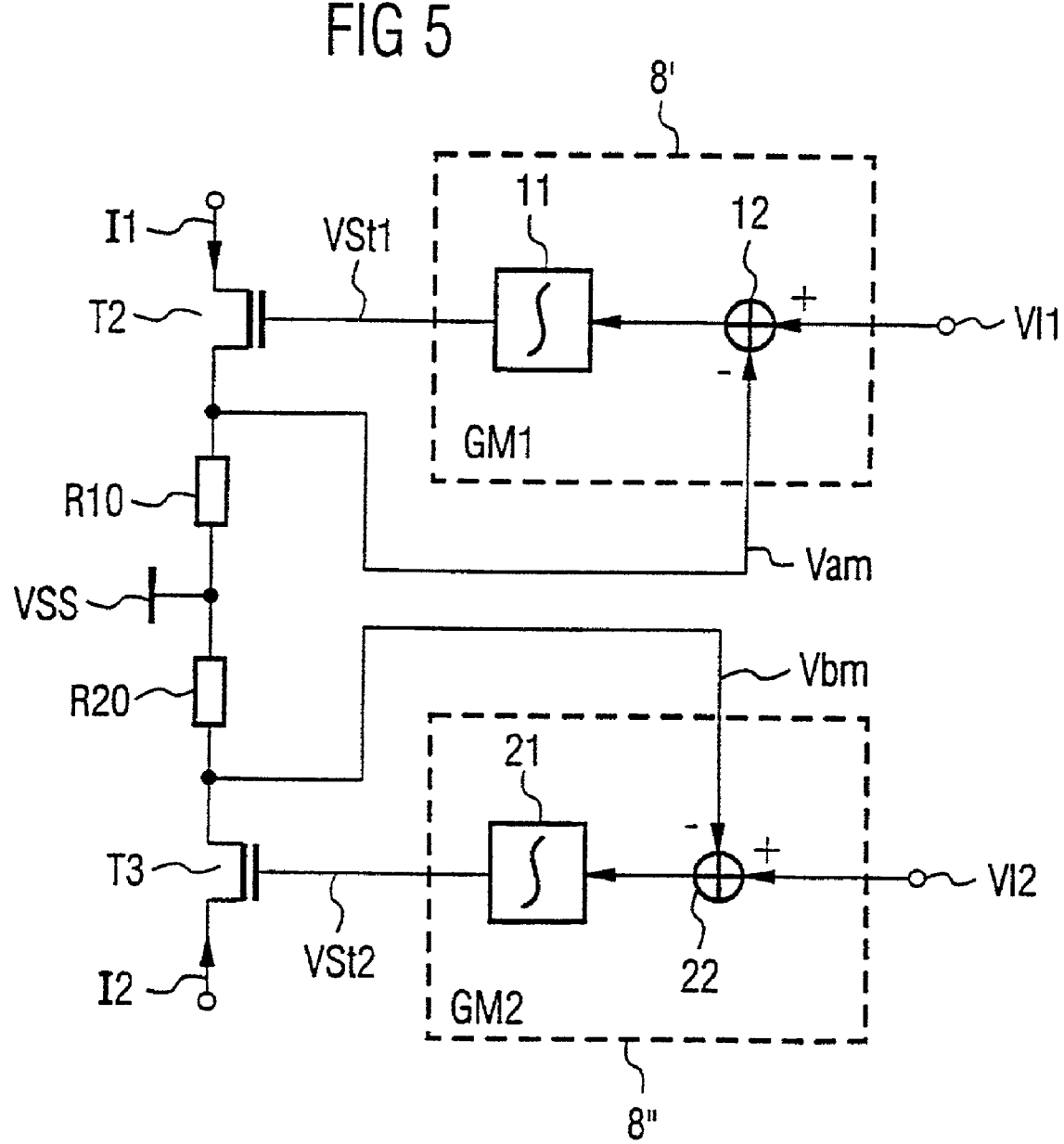
FIG. 5 shows two voltage-controlled power sources for setting a first and second conduction current according to FIG. 4.

FIG. 5 illustrates the design of the first and second analog integrator circuits and the adjustability of the first conduction current I1 and of the second conduction current I2 by means of the first transistor T2 or the second transistor T3.

The first analog control signal VI1 and the potential Vam, which is tapped at the connecting point of the load path of the first transistor T2 and of the first resistor R10, are fed to a first subtractor circuit 12 at whose output a difference voltage VI1−Vam is present. The difference voltage VI1−Vam is integrated by a first integrator circuit 11. A voltage VSt1 which is fed to the control terminal of the first transistor T2 is present at the output of the first integrator circuit 11. The first conduction current I1 is set by means of the first transistor T2. The first integrator circuit 11 integrates the difference voltage VI1−Vam until the difference voltage VI1−Vam=0. A conductance value GM1=I1/VI1=1/R10 can be derived from this using Vam=R10*I1=VI1.

The first conduction current I1 is thus controlled by means of the first analog signal VI1 of the digital controller in such a way that the necessary ringing impedance Z1, given a positive half-wave of the ringing alternating voltage V~, is calculated from the amplification factor ksense1 of the first voltage divider R30 and R50, a first transmission function k1 of the digital filter 4 and the conductance value GM1 of the first analog integrator circuit 8':

$$Z1 = \frac{Va\sim}{I1} = \frac{1}{ksense1 \cdot k1 \cdot GM1} = \frac{R10}{ksense1 \cdot k1} = f_1(k1)$$

The first conduction current I1 can thus be set by means of the first transistor T2. The first transistor T2 can in turn be set by means of the programmable first transmission function k1 of the digital filter 4. The ringing impedance thus depends on the programmable first transmission function k1 of the digital filter 4 and can be adapted to various specific requirements for particular countries by simply reprogramming the first transmission function k1 of the digital filter 4. To do this, specific values for the ringing impedance for particular countries can be stored in the memory 11, for example. The control device 10 reads out of the memory 11 the values which are necessary for programming a specific ringing impedance for a particular country and reprograms the first transmission function k1 of the digital filter 4 accordingly.

The second analog control signal VI2 and the potential Vbm which is tapped at the connecting point of the load path of the second transistor T3 and of the second resistor R20 are fed to a second subtractor circuit 22 at whose output a difference voltage VI2−Vbm is present. The difference voltage VI2−Vbm is integrated by a second integrator circuit 21. A voltage VSt2 which is fed to the control terminal of the second transistor T3 is present at the output of the second integrator circuit 21. The second conduction current I2 is set by means of the second transistor T3. The second integrator circuit 21 integrates the difference voltage VI2−Vbm until the difference voltage VI2−Vbm=0. A conductance value GM2=I2/VI2=1/R20 can be derived from this using Vbm=R20*I2=VI2.

The second conduction current I2 is thus controlled by means of the second analog signal VI2 of the digital controller in such a way that the necessary ringing impedance Z2, given a negative half-wave of the ringing alternating voltage V~, is calculated from the amplification factor ksense2 of the second voltage divider R40 and R60, a second transmission function k2 of the digital filter 4 and the conductance value GM2 of the second analog integrator circuit 8'' as:

$$Z2 = \frac{Vb\sim}{I2} = \frac{1}{ksense2 \cdot k2 \cdot GM2} = \frac{R20}{ksense2 \cdot k2} = f_2(k2)$$

The second conduction current I2 can thus be set by means of the second transistor T3. The second transistor T3 can be set in turn by means of the programmable second transmission function k2 of the digital filter 4. The ringing impedance thus depends on the programmable second transmission function k2 of the digital filter 4 and can be adapted to various specific requirements for particular countries by simply reprogramming the second transmission function k2 of the digital filter 4. The reprogramming of the second transmission function k2 is carried out here in a way analogous to the reprogramming of the first transmission function k1.

The first transmission function k1 and the second transmission function k2 are preferably identical, so that the same ringing impedance $Z_{total}$ is respectively set for either a positive or negative half-wave of the ringing alternating voltage V~. This presumes, of course, identical conductance values GM1 and GM2 of the first analog integrator circuit 8' and second analog integrator circuit 8'' and identical voltage divider ratios of the first and second voltage dividers. Thus, with GM1=GM2 and ksense1=ksense2, the ringing impedance $Z_{total}$ obtained is:

$$Z_{total} = Z1 = Z2.$$

However, with the circuit arrangement according to the invention, it is also possible to set an asymmetrical ringing impedance which has a different ringing impedance Z1 for the positive half-wave of the ringing alternating voltage V~ than for the negative half-wave of the ringing alternating voltage V~.

What is claimed is:

1. A circuit arrangement for electrically generating a ringing impedance in a telephone terminal, the circuit arrangement comprising:
    at least one transistor, the ringing impedance being adaptable by controlling a resistance of a first transistor;
    a capacitor; and
    a first input terminal and a second input terminal, the circuit arrangement having a ringing alternating voltage which can be tapped between the first input terminal and the second input terminal;
    wherein a digital controller having a programmable digital filter sets the ringing impedance according to predetermined conditions by generating, from the ringing alternating voltage, a control voltage for controlling the first transistor;
    wherein a transmission function of the programmable digital filter can be set by programming filter coefficients, and
    wherein a digital power inverter circuit is connected upstream of the programmable digital filter and a digital rectifier circuit is connected downstream of the programmable digital filter.

2. The circuit arrangement as claimed in claim 1,
    wherein the digital power inverter circuit, the programmable digital filter and a digital rectifier circuit are integrated on a digital semiconductor chip.

3. The circuit arrangement as claimed in claim 2, further comprising:
    an analog/digital converter connected upstream of the digital power inverter circuit; and
    a digital/analog converter connected downstream of the digital rectifier circuit,
    wherein the analog/digital converter, the digital/analog converter and an analog integrator circuit are integrated on an analog semiconductor chip.

4. The circuit arrangement as claimed in claim 1, further comprising:
    an analog/digital converter connected upstream of the digital power inverter circuit; and
    a digital/analog converter connected downstream of the digital rectifier circuit;
    wherein the analog/digital converter, the digital/analog converter and an analog integrator circuit are integrated on an analog semiconductor chip.

5. A circuit arrangement for electrically generating a ringing impedance in a telephone terminal, the circuit arrangement comprising:

a plurality of transistors, the ringing impedance being adaptable by controlling a resistance of a first transistor;

a first capacitor; and a first input terminal and a second input terminal, the circuit arrangement having a ringing alternating voltage which can be tapped between the first input terminal and the second input terminal;

wherein a digital controller having a programmable digital filter sets the ringing impedance according to predetermined conditions by generating, from the ringing alternating voltage, a control voltage for controlling the first transistor;

wherein a transmission function of the programmable digital filter can be set by programming filter coefficients;

wherein a second capacitor, a load path of a second transistor and a first resistor are arranged in series between the first input terminal and a reference potential, wherein a third capacitor, a load path of a third transistor and a second resistor are arranged in series between the second input terminal and the reference potential, wherein a first input potential and a second input potential of the ringing alternating voltage are fed to the digital controller, and wherein the digital controller provides a first control voltage for driving the second transistor and a second control voltage for driving the third transistor.

6. The circuit arrangement as claimed in claim 5, wherein the digital controller has a first analog integrator circuit connected upstream of the second transistor, the first analog integrator circuit outputting a signal which drives the second transistor and which is integrated from the difference between a first input voltage and a second input voltage, and wherein the digital controller has a second analog integrator circuit connected upstream of the third transistor, the second analog integrator circuit outputting a signal which drives the third transistor and which is integrated from the difference between a third input voltage and a fourth input voltage.

7. The circuit arrangement as claimed in claim 6, further comprising:

at least one analog/digital converter connected upstream of the programmable digital filter; and at least one digital/analog converter connected downstream of a digital rectifier circuit, wherein the analog/digital converter, the digital/analog converter and the analog integrator circuits are integrated on an analog semiconductor chip.

8. The circuit arrangement as claimed in claim 6, further comprising:

a first voltage divider for providing a first component voltage from the first input potential of the ringing alternating voltage, and a second voltage divider for providing a second component voltage from the second input potential of the ringing alternating voltage.

9. The circuit arrangement as claimed in claim 5, further comprising:

a first voltage divider for providing a first component voltage from the first input potential of the ringing alternating voltage, and a second voltage divider for providing a second component voltage from the second input potential of the ringing alternating voltage.

* * * * *